United States Patent
Ping

(10) Patent No.: US 11,618,263 B2
(45) Date of Patent: Apr. 4, 2023

(54) SINTER PROCESSED PRINTHEAD

(71) Applicant: Funai Electric Co., Ltd., Osaka (JP)

(72) Inventor: G. Allan Ping, Lexington, KY (US)

(73) Assignee: Funai Electric Co., Ltd.

(*) Notice: Subject to any disclaimer, the term of this patent is extended or adjusted under 35 U.S.C. 154(b) by 85 days.

(21) Appl. No.: 17/187,745

(22) Filed: Feb. 27, 2021

(65) Prior Publication Data
US 2022/0274417 A1 Sep. 1, 2022

(51) Int. Cl.
*B41J 2/175* (2006.01)

(52) U.S. Cl.
CPC ....... *B41J 2/17559* (2013.01); *B41J 2/17513* (2013.01); *B41J 2/17546* (2013.01); *B41J 2/17553* (2013.01)

(58) Field of Classification Search
CPC .............. B41J 2/17559; B41J 2/17513; B41J 2/17546; B41J 2/17553
USPC .......................................................... 347/86
See application file for complete search history.

(56) References Cited

U.S. PATENT DOCUMENTS

| 5,448,818 | A | * | 9/1995 | Scheffelin | ............ | B41J 2/17523 |
| | | | | | | 29/773 |
| 5,940,099 | A | | 8/1999 | Karlinski | | |
| 6,565,760 | B2 | | 5/2003 | Hardisty et al. | | |
| 7,806,515 | B2 | | 10/2010 | Harvey et al. | | |
| 8,984,752 | B2 | | 3/2015 | Redding et al. | | |
| 10,532,577 | B1 | * | 1/2020 | Porter | ..................... | B29C 64/20 |
| 2004/0239717 | A1 | | 12/2004 | Higa et al. | | |
| 2015/0367647 | A1 | * | 12/2015 | Teramoto | ............. | B41J 2/17503 |
| | | | | | | 347/86 |
| 2016/0200908 | A1 | | 7/2016 | Osaka et al. | | |
| 2018/0117921 | A1 | | 5/2018 | Weaver et al. | | |
| 2020/0139719 | A1 | | 5/2020 | Porter | | |

FOREIGN PATENT DOCUMENTS

WO  WO-2019042591 A1 *  3/2019

* cited by examiner

*Primary Examiner* — Matthew Luu
*Assistant Examiner* — Alexander D Shenderov
(74) *Attorney, Agent, or Firm* — Luedeka Neely Group, PC

(57) ABSTRACT

A fluidic ejection cartridge having a unitary integrally-formed body of sintered metal having an upper portion, a lower portion, a sidewall, and a bottom having a nosepiece, the body defining a reservoir. In various embodiments, the body includes at least one of copper, copper alloy, iron steel, carbon steel, iron-copper steel, copper infiltrated steel, copper steel, iron-nickel steel, nickel steel, low alloy steel, hardened steel, diffusion alloyed steel, 300 series stainless steel, 400 series stainless steel, and soft magnetic alloy. Some embodiments include a lid of the sintered metal disposed over and sealed to the upper portion of the body. Some embodiments include a chip in fluid flow communication with the reservoir. Some embodiments include a filter disposed in the reservoir at the lower portion of the body. Some embodiments include a volume of an ejectable fluid disposed within the reservoir.

20 Claims, 2 Drawing Sheets

SINTER PROCESSED PRINTHEAD

FIELD

This disclosure relates to the field of cartridge systems for fluidic ejection. More particularly, this disclosure relates to a cartridge system for fluidic ejection having a molded sintered metal cartridge body.

INTRODUCTION

Fluidic ejection cartridges are used to jet or express a fluid in a variety of different applications, such as traditional inkjet printing. Most of the inks used in these printing systems are water-based and print on paper or some other commonly used substrate. Cartridges for such applications can be formed of a variety of inexpensive materials, such as plastics, that are relatively easy to work with and which are adequate for such low-demand applications.

However, there exist many jetting applications that express materials other than standard ink pigments, using solvents other than water, in environments that are more demanding or regulated that standard consumer printing operations. For example, some applications require non-aqueous solvent based materials to be expressed, and some applications are regulated as to the type of equipment that can be used, such as food service or drug delivery applications.

Unfortunately, the plastics that are used in traditional inkjet printing cartridges might not be chemically resistant to the non-aqueous solvents that are required by some of these applications, or might not be able to be cleaned adequately to meet the regulatory standards of such applications.

What is needed, therefore, is a fluidic ejection cartridge and a process for its fabrication that tends to reduce issues such as those suggested above, at least in part.

SUMMARY

The above and other needs are met by a fluidic ejection cartridge having a unitary integrally-formed body of sintered metal having an upper portion, a lower portion, a sidewall, and a bottom having a nosepiece, the body defining a reservoir.

In various embodiments according to this aspect of the invention, the body includes at least one of copper, copper alloy, iron steel, carbon steel, iron-copper steel, copper infiltrated steel, copper steel, iron-nickel steel, nickel steel, low alloy steel, hardened steel, diffusion alloyed steel, 300 series stainless steel, 400 series stainless steel, and soft magnetic alloy. Some embodiments include a lid of the sintered metal disposed over and sealed to the upper portion of the body. Some embodiments include a chip in fluid flow communication with the reservoir. Some embodiments include a filter disposed in the reservoir at the lower portion of the body. Some embodiments include a volume of an ejectable fluid disposed within the reservoir.

In some embodiments, the ejectable fluid includes at least one organic solvent selected from the group consisting essentially of alcohols, acetates, ketones, hydrocarbon solvents, halogenated solvents, and lactones, and not an aqueous-based solvent. In some embodiments, the ejectable fluid includes at least one organic solvent selected from the group consisting of methanol, ethanol, isopropanol, butanol, 1-methoxy-2-propanol, 2-butoxyethanol, ethyl acetate, butyl acetate, acetone, methyl ethyl ketone, methyl isobutyl ketone, benzene, toluene, xylene, hexane, petroleum, chloroform, diodomethane, N-ethyl-2-pyrrolidone, N-methyl-pyrrolidone, and γ-butyrolactone, and not an aqueous-based solvent. In some embodiments the ejectable fluid is a printing ink and further comprises a pigment or dye.

According to another aspect of the invention there is described a method for fabricating a sintered metal cartridge, by forming a precursor material of a metal and binder into a shape of a cartridge having a sidewall and a bottom having a nosepiece, and heating the precursor material to transform the precursor material into a sintered metal piece.

Various embodiments according to this aspect of the invention include an initial heating step to remove the binder from the metal in the precursor material. Some embodiments include a final heating step to flow the metal into the sintered metal piece. Some embodiments include post processing the sintered metal piece by at least one of cleaning, passivating, polishing, deburring, marking, and engraving. Some embodiments include placing a filter into the sintered metal cartridge. Some embodiments include inserting a fluid-absorbent block into the sintered metal cartridge. Some embodiments include attaching a flex circuit and chip to the sintered metal cartridge. Some embodiments include filling the sintered metal cartridge with an ejectable fluid. Some embodiments include attaching a lid to the sintered metal cartridge. Some embodiments include attaching a lid to the sintered metal cartridge, where the lid is formed of the sintered metal.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

The present disclosure describes a fluidic ejection cartridge that is suitable for use with fluid mixtures having an organic, as opposed to aqueous, solvent base. The cartridge described is also usable for food service or drug delivery applications, as described in more detail hereinafter. A method for the fabrication of the cartridge is also described.

Figure 1:
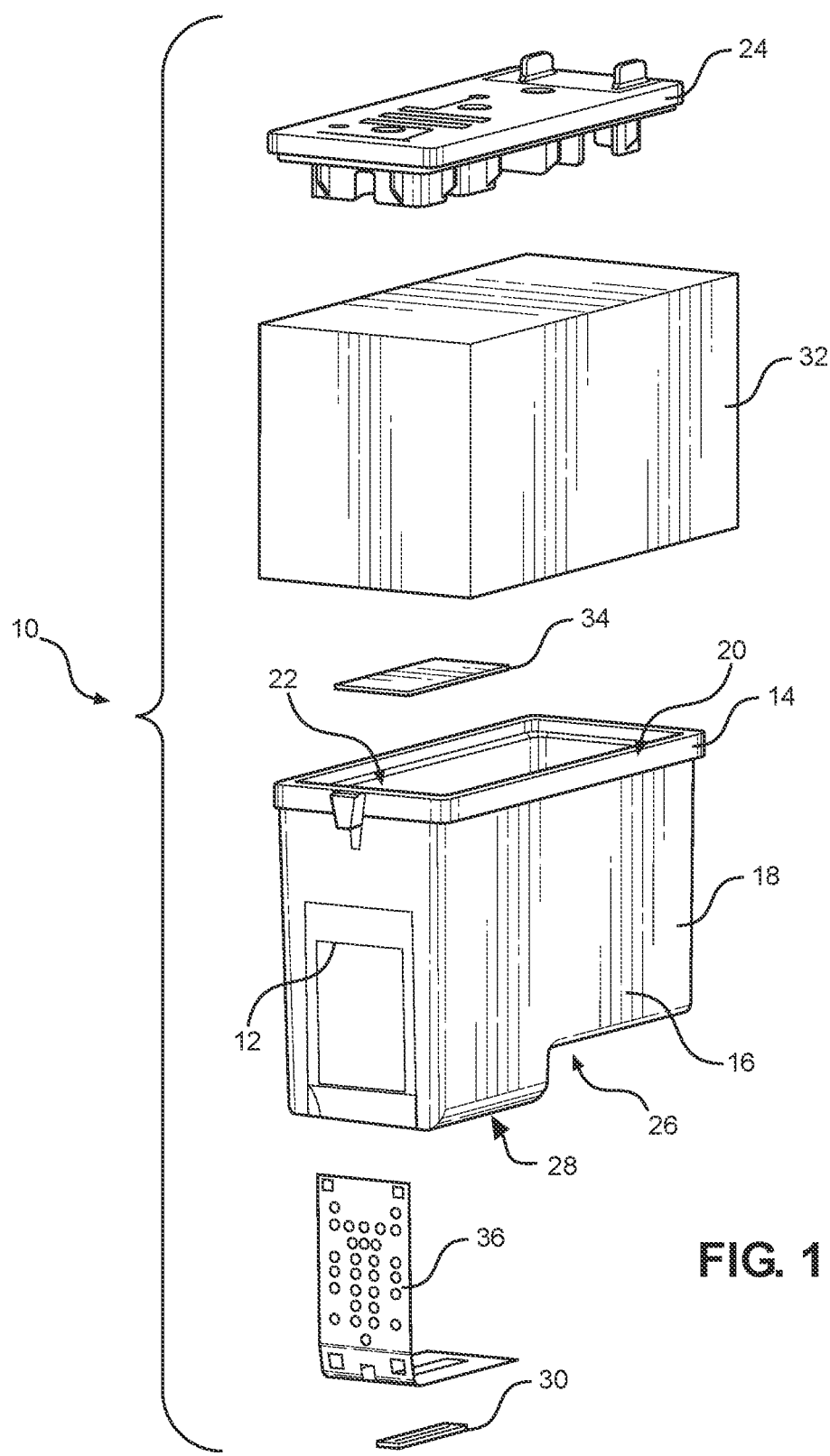
FIG. 1 is a fluidic ejection cartridge according to an embodiment of the present invention.

With reference now to FIG. 1, there is depicted a cartridge 10 according to an embodiment of the present invention, with a body 12 having an upper portion 14, a lower portion 16, sidewalls 18, and a bottom 26 that is disposed under and integrally formed to the lower portion 16 of the cartridge body 12. A hollow cavity 20 is created within the body 12 by the sidewalls 18 and the bottom 26, which cavity 20 defines a reservoir 22. The cartridge 10 as depicted in this embodiment also includes a lid 24. The lid 24 is a separately-formed piece that is disposed over and sealed to the upper portion 14 of the body 12.

Notably, according to one embodiment of the present disclosure, the body 12 and the lid 24 are both made from a sintered metal material. As used herein, sintered metals include metals that are formed from powdered metal precursors that are mixed with organic binder materials, pressed into a desired shape, and then heated so as to remove the binder materials and fuse the metal into a solid, non-porous piece having the desired shape. Examples of such metals include copper and copper alloys, iron and carbon steels, iron-copper steels, copper infiltrated steels, copper steels, iron-nickel and nickel steels, low alloy steels, hardened steels, diffusion alloyed steels, 300 series stainless steels, 400 series stainless steels, and soft magnetic alloys.

As noted above, the lid 24 is sealed to the upper portion 14 of the body 12. The lid 24 may be sealed to the body 12 using adhesives, sintered metals, press-fitting, or welding in various embodiments.

The cartridge 10 also includes a nosepiece 28, which is a portion of the bottom 26 that has a specialized function to support at least one fluidic ejection chip 30 that is in fluid flow communication with the fluid reservoir 22, via a hole in the nosepiece 28. The ejection chip 30 includes a plurality of nozzles for ejection of a fluid from the reservoir 22. In certain embodiments, the cartridge 10 also includes an absorbent block 32 that is disposed within the fluid reservoir 22, as well as a fluid filter element 34 that is disposed between the fluid reservoir 22 and the fluidic ejection chip 30.

In addition, many embodiments of the cartridge 10 include a flexible interconnect circuit 36 that is attached to the sidewall 18 and electrically connected to the fluidic ejection chip 30, for providing electronic control of the ejection chip 30.

By forming the body 12 of the cartridge 10 from a sintered metal, the amount of flexing of the body 12 and the degree of thermal expansion and contraction of the body 12 tends to be reduced from what would be experienced by a typical plastic body 12 under similar environmental conditions. This tends to reduce the stresses that are imparted to the fluid ejection chip 30, which tends to reduce the frequency of occurrence of cracking of the chip 30 and separation of the chip 30 from the body 12.

The cartridge 10 includes a volume of an ejectable fluid that is disposed within the fluid reservoir 22, and in some embodiments permeates the block 32. In some embodiments, this ejectable fluid is an aqueous mixture. In other embodiments, the ejectable fluid is a non-aqueous organic-based solvent. For example, the ejectable fluid is an organic solvent including at least one of alcohol, acetate, ketone, oil, hydrocarbon solvent, halogenated solvent, and lactone. In some more specific embodiments, the ejectable fluid includes at least one of methanol, ethanol, isopropanol, butanol, 1-methoxy-2-propanol, 2-butoxyethanol, ethyl acetate, butyl acetate, acetone, methyl ethyl ketone, methyl isobutyl ketone, benzene, toluene, xylene, hexane, petroleum, chloroform, diodomethane, N-ethyl-2-pyrrolidone, N-methyl-pyrrolidone, and γ-butyrolactone.

In some embodiments, the fluidic ejection cartridge 10 is used as an inkjet printing cartridge. In some embodiments, the ejectable fluid within the cartridge 10 is a suitable printing ink and includes solid pigment particles dispersed within the solvent. In some embodiment, the cartridge 10 is used in the food preparation industry, such as by jetting food coloring or other edible materials onto food surfaces, such as cookies and cakes.

In other embodiments, the fluidic ejection cartridge 10 is used for purposes other than printing. For example, the fluidic ejection cartridge 10 of the present disclosure can be used for the controlled fluidic release of fragrances or essential oils, for delivery of drugs in fluidic quantities, or for delivery of fluids in electronic vaping devices.

In some embodiments, the fluidic ejection cartridge 10 of the present disclosure is used for printing on a non-porous substrate. For example, the cartridge 10 may be used in drop-on-demand printing system to print desired indicia on substrates such as plastics, metals, glass, and plastic-coated paper. In other embodiments, the cartridge 10 is used to print upon more porous substrates, such as uncoated papers.

In the printing of non-porous substrates such as plastics, glass, or metals, the cartridge 10 is particularly advantageous because the use of sintered metal, rather than conventional polymers, in the construction of the cartridge 10 allows for the use of a much wider array of solvents. Typically, in conventional inkjet cartridges made from plastic or polymeric materials, it is necessary to use inks that have an aqueous solvent base rather than an organic solvent base. If inks having an organic solvent based are used in such cartridges 10, the ink solvents tend to penetrate the plastics used in the cartridges 10, causing the cartridge 10 to partially dissolved or otherwise damaged.

According to the present disclosure, the body 18 and lid 24 are formed from sintered metals, which are impervious to organic solvents such alcohols, acetates, ketones, oils, hydrocarbon solvents, halogenated solvents, and lactones. Thus, these organics may now be used as solvents in the fluid formulation. This is of particular benefit when printing upon non-porous substrates because organic solvent-based fluids of this type have been found to provide better penetration of and adhesion to the non-porous substrate being printed.

Figure 2:
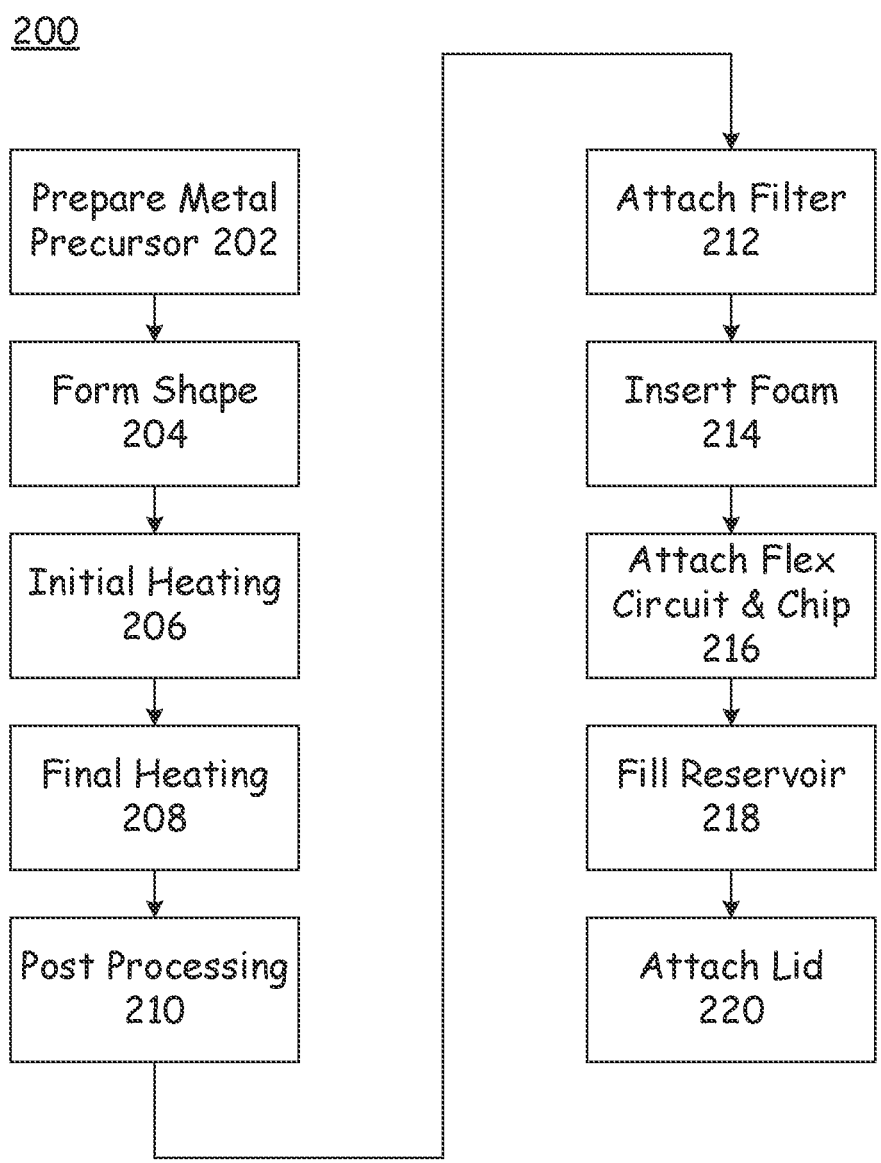
FIG. 2 is flow chart for a method for forming a fluidic ejection cartridge according to an embodiment of the present invention.

With reference now to FIG. 2, there is depicted a flow chart for a method for forming the cartridge 10 according to an embodiment of the present disclosure. The metal precursor material is prepared, as given in box 202. The metal portion of the precursor material can be any one or more of the materials as described elsewhere herein. The metal portion is, in some embodiments, mixed with an organic binder that allows the precursor material to hold a desired shape when it is pressed into that shape.

The precursor material is formed into the desired shape of the sides 18 and bottom 24 of the body 12, as given in block 204. In one embodiment, this is accomplished by pouring the powdered or finely granulated precursor material into a mold of the shape of the outer shell of the body 12, and then pressing an inner mold of the interior shape of the body 12 into the precursor material and the outer mold, thus distributing the precursor material evenly throughout the space between the inner mold and the outer mold. In some embodiments the inner mold and the outer mold are positioned first, and then the precursor material is poured and pressed into the space between them.

Processing of some type may be required for the precursor material to retain the shape of the mold, prior to removing the formed precursor material from the mold. This processing can depend upon the type of precursor material used. In some embodiments, the step of initial heating, as given in block 206, comprises this initial processing. The initial processing in some embodiments is a heating process in the absence of an oxidizing agent such as oxygen, which volatizes and removes the organics in the precursor material, driving them away from the metal in the precursor material. This can be performed either before or after the mold is removed from the formed shape.

A final heating step is performed, as given in block 208, in which the particles of metal remaining in the formed shape are heated under conditions sufficient to cause the particles to flow together and create a solid, unified, sintered-metal body 12, including sidewalls 18 and bottom 26.

This can also be performed, in various embodiments, either before or after releasing the formed body 12 from the mold. In some embodiments, the final heating step 208 is also performed in the absence of an oxidizing agent such as air. A post processing step, as given in block 210, is performed in some embodiments, in which the formed body 12 is one or more of cleaned, passivated, polished, deburred, marked, or engraved as desired.

As given in block 212, the filter 34 is optionally inserted in or near the nosepiece 28, which in some embodiments is used to prohibit the passage of particles that are too large to flow through the vias and nozzles of the chip 30. As desired, depending upon the application intended for the cartridge 10, a foam or other absorbent block 32 is placed into the reservoir 22 in the body 12. The block 32 is useful for releasing the volume of fluid to be dispensed by the cartridge 10 in a controlled manner.

A flex circuit 36 and the chip 30 are attached to the body 12, either as a preformed piece that includes both elements, or first one and then the other. The reservoir 22 is eventually filled, as given in block 218, and the lid 24 is attached, as given in block 220. In various embodiments, the lid 24 is formed of the same material and in the same manner as the body 10, and can be attached to the body 10 in a variety of different ways, as described elsewhere herein.

As used herein, the phrase "at least one of A, B, and C" means all possible combinations of none or multiple embodiments of each of A, B, and C, but at least one A, or one B, or one C. For example, and without limitation: Ax1, Ax2+Bx1, Cx2, Ax1+Bx1+Cx1, Ax1+Bx12+Cx113. It does not mean Ax0+Bx0+Cx0.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A fluidic ejection cartridge comprising a unitary integrally-formed sintered powder metal body having an upper portion, a lower portion, a sidewall, a bottom having a nosepiece, the sintered powder metal body defining a fluid reservoir, and having at least one fluidic ejection chip attached to the nosepiece in fluid flow communication with the fluid reservoir via a hole in the nosepiece.

2. The fluidic ejection cartridge of claim 1, wherein the sintered powder metal body comprises at least one of copper, copper alloy, iron steel, carbon steel, iron-copper steel, copper infiltrated steel, copper steel, iron-nickel steel, nickel steel, low alloy steel, hardened steel, diffusion alloyed steel, 300 series stainless steel, 400 series stainless steel, and soft magnetic alloy.

3. The fluidic ejection cartridge of claim 1, further comprising a sintered powder metal lid disposed over and sealed to the upper portion of the sintered powder metal body.

4. The fluidic ejection cartridge of claim 1, further comprising a filter disposed in the fluid reservoir at the lower portion of the sintered powder metal body.

5. The fluidic ejection cartridge of claim 1, further comprising a volume of an ejectable fluid disposed within the fluid reservoir.

6. The fluidic ejection cartridge of claim 5, wherein the ejectable fluid comprises at least one organic solvent selected from the group consisting essentially of alcohols, acetates, ketones, hydrocarbon solvents, halogenated solvents, and lactones, and not an aqueous-based solvent.

7. The fluidic ejection cartridge of claim 5, wherein the ejectable fluid comprises at least one organic solvent selected from the group consisting of methanol, ethanol, isopropanol, butanol, 1-methoyx-2-propanol, 2-butoxyethanol, ethyl acetate, butyl acetate, acetone, methyl ethyl ketone, methyl isobutyl ketone, benzene, toluene, xylene, hexane, petroleum, chloroform, diodomethane, N-ethyl-2-pyrrolidone, N-methyl-pyrrolidone, and γ-butyrolactone, and not an aqueous-based solvent.

8. The fluidic ejection cartridge of claim 5, wherein the ejectable fluid is a printing ink and further comprises a pigment or dye.

9. A method for fabricating a sintered powder metal fluid ejection cartridge, the method comprising the steps of:
   forming a precursor material comprising a metal and binder into a shape of a cartridge having a sidewall and a bottom having a nosepiece,
   pouring the precursor material into an outer mold,
   pressing an inner mold into the precursor material in the outer mold,
   heating the precursor material to transform the precursor material into a sintered powder metal piece, and
   attaching at least one fluidic ejection chip to the nosepiece.

10. The method of claim 9, wherein the step of heating further comprises an initial heating step to remove the binder from the metal in the precursor material.

11. The method of claim 9, wherein the step of heating further comprises a final heating step to flow the metal into the sintered powder metal piece.

12. The method of claim 9, further comprising the step of post processing the sintered powder metal piece by at least one of cleaning, passivating, polishing, deburring, marking, and engraving.

13. The method of claim 9, further comprising the step of placing a filter into the sintered powder metal fluid ejection cartridge.

14. The method of claim 9, further comprising the step of inserting a fluid-absorbent block into the sintered powder metal fluid ejection cartridge.

15. The method of claim 9, further comprising the step of attaching a flex circuit to the sintered powder metal fluid ejection cartridge and to the at least one fluidic ejection chip.

16. The method of claim 9, further comprising the step of filling the sintered powder metal fluid ejection cartridge with an ejectable fluid.

17. The method of claim 9, further comprising the step of attaching a lid to the sintered powder metal fluid ejection cartridge.

18. The method of claim 9, further comprising the step of attaching a sintered powder metal lid to the sintered powder metal fluid ejection cartridge.

19. A fluidic ejection cartridge comprising a unitary press-molded sintered powder metal body having an upper portion, a lower portion, a sidewall, a bottom having a nosepiece, the sintered powder metal body defining a fluid reservoir, and having at least one fluidic ejection chip attached to the nosepiece in fluid flow communication with the fluid reservoir via a hole in the nosepiece.

20. The fluidic ejection cartridge of claim 19, further comprising a filter disposed in the fluid reservoir at the lower portion of the sintered powder metal body.

* * * * *